United States Patent [19]

Richards

[11] 4,384,659

[45] May 24, 1983

[54] APPARATUS AND METHOD FOR PUMPING POWDERED MATERIAL

[76] Inventor: John A. Richards, 1611 Sierra Alta, Santa Ana, Calif. 92705

[21] Appl. No.: 899,234

[22] Filed: Apr. 24, 1978

[51] Int. Cl.³ .............................................. B65D 83/06
[52] U.S. Cl. ....................................... 222/1; 222/636; 222/366
[58] Field of Search ................ 222/1, 195, 217, 424.5, 222/263, 343, 344, 361, 366, 372, 381, 355, 365, 222/216, 636; 417/469, 900

[56] References Cited

U.S. PATENT DOCUMENTS

| | | | |
|---|---|---|---|
| 2,200,350 | 5/1940 | Werner | 222/216 X |
| 3,266,433 | 8/1966 | Mason | 417/469 X |
| 3,452,689 | 7/1969 | Kinney et al. | 222/381 X |
| 3,578,216 | 5/1971 | Pearson | 222/195 |
| 4,036,564 | 7/1977 | Richards | 417/900 X |

Primary Examiner—Stanley H. Tollberg
Attorney, Agent, or Firm—Harry W. F. Glemser

[57] ABSTRACT

An apparatus and method for pumping powdered materials.

The apparatus includes a hopper having a discharge outlet in one end wall thereof. An agitator gently stirs the powdered material to prevent it from bridging and packing in the hopper. A sliding cylindrical sleeve, axially aligned with the discharge outlet, and a main piston therein are movable in the hopper for successively entrapping, or segregating, and discharging a portion of the powdered material through the discharge outlet. An auxiliary hydraulic cylinder within the sleeve contains a plunger that slides through a bore in the main piston. The plunger is independently movable relative to the main piston and sleeve, and, upon retraction, provides a void in the entrapped material to prevent bridging and packing in the sleeve. A fluidizing element in the hopper below the path of travel of the sleeve keeps the powdered material in a loose condition to further eliminate any tendency to bridge or pack in the sleeve. A slide valve is mounted on said one end wall of the hopper for controlling the discharge of powdered material from the discharge outlet into a chamber that may be pressurized.

The method comprises essentially, extending the plunger into the body of powdered material, entrapping a portion of the powdered material adjacent to and surrounding the plunger, withdrawing the plunger from the entrapped powdered material to form a void therein, and discharging the entrapped material.

18 Claims, 11 Drawing Figures

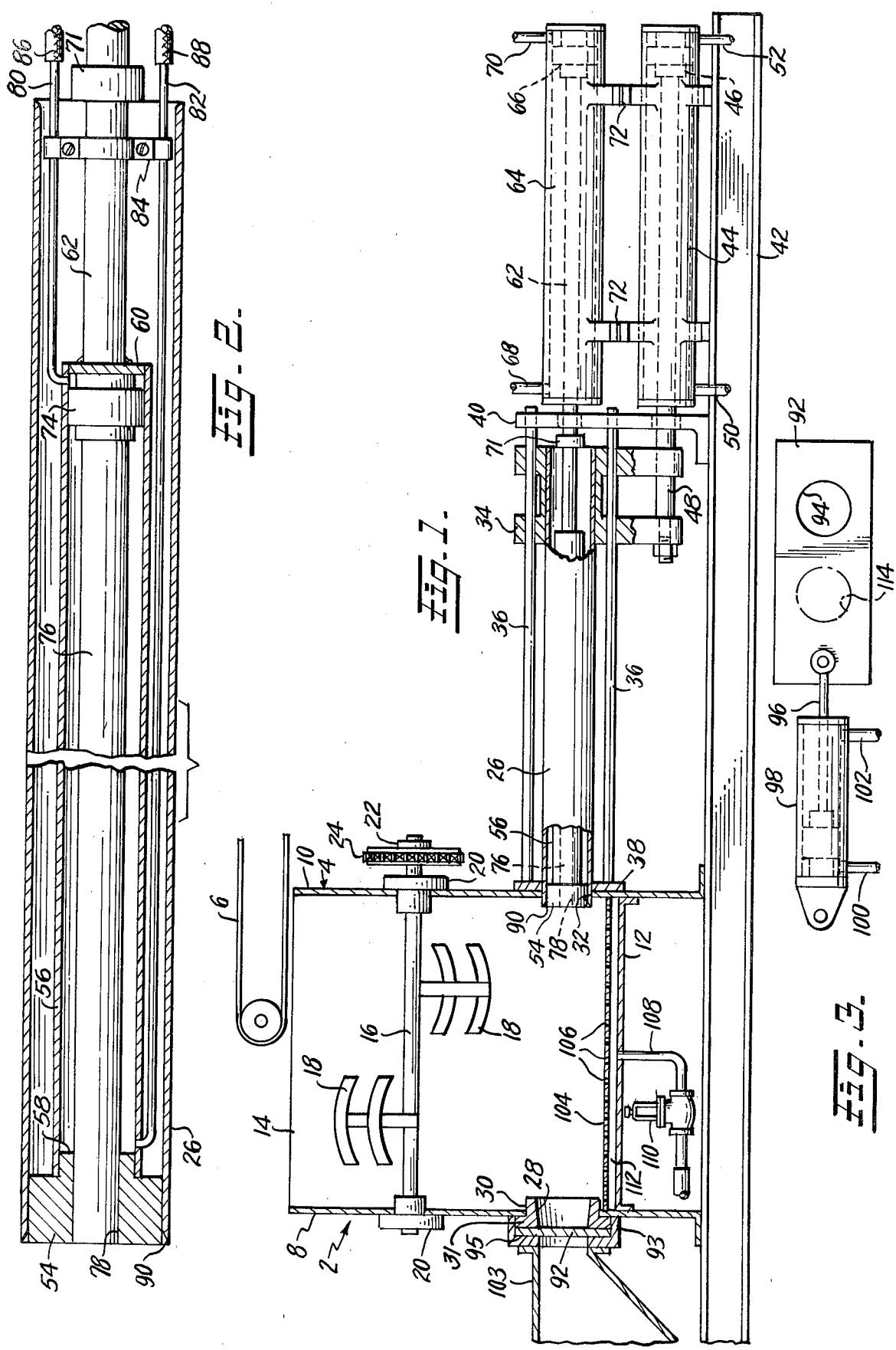

APPARATUS AND METHOD FOR PUMPING POWDERED MATERIAL

BACKGROUND OF THE INVENTION

1. Field of the Invention

The present invention relates to pumping apparatus and, more particularly, to an improved method and apparatus for continuously pumping powdered materials without bridging or packing in either the material hopper or in the pumping cylinder or sleeve.

2. The Prior Art

It is well known that powdered materials, when pushed through a cylinder by a piston, tend to bridge, pack, or form a plug. It is then necessary to break the bridge, loosen the packed material or remove the plug before pumping can be resumed. Further, with prior devices, when pumping the powdered material into a pressurized vessel, as soon as the pumping chamber has been filled and the discharge valve is opened, the end of the pumping chamber is placed in direct communication with the pressurized vessel. The pressure from the vessel tends to act the same as a moving piston and produces a plug in the pumping chamber, thereby creating discharge problems.

Other prior devices seek to transport the powdered material through conduits, using compressed air as the carrier, but such devices are prone to pack and clog. Still others mix the powdered material with a liquid medium to provide a slurry that can be pumped, but these are unsatisfactory for use in installations in which it is desired to use the powdered material in a loose dry form.

The foregoing objections and disadvantages are avoided by the present method and apparatus, which embodies "fluidization" of the powdered material in the hopper and provides novel means for forming a void in entrapped powdered material before discharging it, as will be described more fully hereinafter.

The terms "fluidize," "fluidizing" or "fluidization," as used herein, mean subjecting the powdered material to the action of gas or air to suspend the powdered particles and to reduce and maintain its density in the hopper fairly constant.

SUMMARY OF THE INVENTION

The present invention relates to a novel method and apparatus for pumping powdered materials that inherently tend to bridge or pack during the pumping operation. The apparatus includes a hopper for receiving powdered material from a conveyor or other source. The hopper contains an agitator rotated at a low speed, to prevent bridging of the powdered material, coal for example, as portions of the material below the agitator are pumped out of the hopper. Bridging and packing of the powdered coal is also prevented by fluidization thereof by passing an inert gas, such as nitrogen or ordinary air, upwardly therethrough to loosen the material and to maintain it at a desired, substantially constant density.

The pumping of the powdered material is effected by closing a valve at the discharge outlet of the hopper and extending a solid plunger into the hopper until it contacts the discharge valve. The discharge valve is maintained in its closed position while a sleeve is extended into the hopper to entrap, or segregate, a charge of the powdered material adjacent to and surrounding the plunger. The plunger is then retracted, leaving a void in the material in the sleeve. The discharge valve is opened and a main piston is extended into the sleeve to discharge the entrapped powdered material therefrom. The valve is then closed and the main piston and sleeve are retracted. The foregoing cycle of operation is then repeated so long as desired.

More specifically, the main piston is mounted in the sleeve and has connected to it an auxiliary cylinder, which operates the void-forming plunger, which is extendible through a bore in the main piston. The main piston, the sleeve, and the plunger are hydraulically operated, as is also a valve mounted on the hopper for controlling the discharge of material from the hopper into a collecting chamber that may be pressurized, depending upon the environment in which the pumping apparatus is used. The agitator blades are mounted in the hopper above the path of travel of the sleeve. The fluidization means is located below said path of travel.

The pumping apparatus is designed to prevent bridging or packing of the powdered material in the pumping sleeve so that it can be readily discharged therefrom, even into a pressurized chamber. The plunger provides a void in the sleeve so that when the plunger is retracted and the discharge valve is opened, any pressure entering the sleeve is distributed throughout the void instead of acting like a piston and causing the powdered material to pack in the sleeve.

Accordingly, the principal object of the invention is to provide an improved pumping apparatus and method for pumping various powdered materials comprising particles that inherently tend to cling together, without causing bridging or packing of the materials.

Another object is to provide a void in a pumping chamber for pumping powdered material in such manner as to prevent bridging of the material in said chamber during discharge of material therefrom.

A further object is to provide a method and apparatus for pumping powdered material into a pressurized chamber while preventing pressure from said chamber from acting like a piston and causing packing of the material in the pumping apparatus.

A still further object is to provide means for maintaining powdered material to be pumped in a loose condition and at a substantially constant density.

A more specific object is to provide a method and apparatus for pumping powdered coal into a retort for fractionation.

Other objects and advantages will be apparent from the following description taken in conjunction with the accompanying drawings.

DESCRIPTION OF THE DRAWINGS

FIG. 1 is a diagrammatic view, partly in cross-section, of the present pumping apparatus, but omitting the hydraulic fluid connections for the auxiliary cylinder;

FIG. 2 is a longitudinal cross-sectional view through the sleeve and auxiliary cylinder, and showing the operating fluid connections to said cylinder;

FIG. 3 is a view of the slidable element of the discharge control valve and the cylinder for operating the same.

DESCRIPTION OF THE PREFERRED EMBODIMENT

Figure 4:
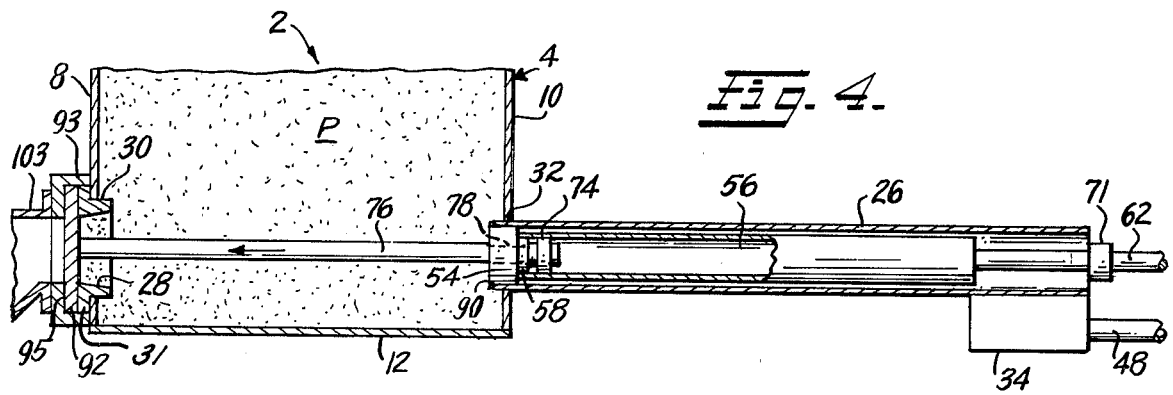
FIGS. 4 to 11 are schematic views illustrating the sequence of operation of the auxiliary plunger, the cylindrical sleeve, the main piston, and the discharge control valve during a pumping cycle.

Referring to FIG. 1, a powdered material pumping apparatus is generally identified by the numeral 2, and includes an open hopper 4, which receives powdered material (coal, for example) from a conventional supply conveyor 6. The hopper 4 includes opposed end walls 8 and 10 and a removable bottom wall 12. The hopper also includes side walls 14 (only one shown) that slope slightly downwardly and inwardly toward the bottom wall 12.

Mounted to extend longitudinally through the hopper 4 is a shaft 16 having conventional agitator blades 18 secured thereto. The shaft 16 is rotatably mounted in bearings 20 secured to the hopper end walls 8 and 10. The shaft 16 is driven through a sprocket 22 and a chain 24 from any conventional power source, such as a reversible hydraulic motor (not shown). The shaft 16 may be driven in either direction to rotate the blades 18 in the hopper 4 to maintain the powdered material in a loose free-flowing condition and, at the same time, prevent it from "bridging" and to urge it downwardly toward the bottom of the hopper. The agitator blades 18 are rotated slowly so that the powdered material is not caused to rise into the surrounding air.

A pumping sleeve 26 is cylindrical in shape and is dimensioned to have an outside diameter that is equal to the smallest diameter of a tapered discharge outlet 28 in a collar 30 extending through the end wall 8. The collar 30 is part of an inner wear plate 31 that engages one side of a slide valve 92. The sleeve 26 is slidably mounted in an opening 32 in the end wall 10 through which it is adapted to be extended and retracted. One end of the sleeve 26 is fixed in a crosshead 34 slidably mounted upon a pair of guide rods 36 having an end thereof secured to a bracket 38 mounted on the end wall 10. The other end of the guide rods 36 is secured in a pedestal 40 mounted upon a frame 42. A cylinder 44 is also mounted on the frame 42 and contains a piston 46 connected by a piston rod 48 to the crosshead 34. Operating fluid for reciprocating the piston 46 (preferably hydraulic) is supplied to the opposite ends of the cylinder 44 through conduits 50 and 52.

A main pumping piston 54 is slidably mounted in the sleeve 26 and is operable independently of the sleeve. Thus, an auxiliary cylinder 56 is disposed in the sleeve 26 and is connected at one end to a boss 58 (FIG. 2) on one side of the main piston 54. The opposite end of the cylinder 56 is closed by a head 60 connected to a piston rod 62 extending from a cylinder 64 (FIG. 1). The piston rod 62 is connected to a piston 66 in the cylinder 64. Hydraulic operating fluid for reciprocating the piston 66 is supplied to opposite ends of the cylinder 64 through conduits 68 and 70. A stop 71 mounted on the piston rod 62 can engage the adjacent end of the sleeve 26 to prevent movement of the main piston 54 beyond the inner end of the sleeve 26. The cylinder 64 may be mounted above the cylinder 44 and aligned therewith by joining mutually extending feet and intervening shims generally indicated at 72. An auxiliary piston 74 (FIG. 2) is mounted in the auxiliary cylinder 56 on a plunger 76 that is extendible and retractible through a bore 78 in the main piston 54. Operating fluid is supplied to the opposite ends of the auxiliary cylinder 56 through tubes 80 and 82 to reciprocate the piston 74. Since the auxiliary cylinder 56 is movable back and forth within the sleeve 26, the tubes 80 and 82 are steadied by a double clamp 84 mounted upon the piston rod 62. The tubes 80 and 72 are also connected to flexible hoses 86 and 88, respectively.

The forward or open end of the sleeve 26 is preferably beveled inwardly as indicated at 90, so that it can be more easily advanced through the material in the hopper 4 until it enters the outlet 28 and engages the inner side of a slide valve 92 mounted on the end wall 8. The slide valve 92 is schematically shown guided within a housing 93, which also comprises an outer wear plate 95. The valve 92 actually may be of the hydraulically actuated type shown in my prior U.S. Pat. No. 4,036,564, including wear plates and seals, as disclosed in said patent. The valve 92 has a port 94, best shown in FIG. 3, that is moved into registration with the discharge outlet 28 of the hopper 4 when material is to be discharged from the sleeve 26, as will be explained more fully hereinafter. The valve 94 is connected to the piston rod 96 of a hydraulic cylinder 98 to which operating fluid is supplied through conduits 100 and 102. A tapered discharge chute 103, which may be open to the atmosphere, or comprise an element of a pressurized vessel or reactor for fractionating the powdered coal, is arranged to receive material discharged through the outlet 28. The tapered configuration of the discharge chute 103 is designed to prevent blockage at the point of discharge of pumped material.

In order to prevent the powdered coal from packing in the hopper 4, fluidizing means 104 is disposed in the hopper, below the path of travel of the sleeve 26, and is provided with a multiplicity of perforations 106 through which an inert gas under relatively low pressure is continuously introduced, while the pumping apparatus is in operation. An inert gas, such as nitrogen, is supplied through a conduit 108 having a conventional, adjustable, pressure-regulating valve 110 connected therein. This valve is set to suit the particular material to be fluidized. The gas enters a chamber 112 in the hopper 4 below the fluidizing means 104 and flows upwardly through the perforations 106. In some instances, ordinary air under pressure may be used in lieu of an inert gas, depending upon circumstances of use. The gas introduced into the hopper 4 is diffused through the powdered material and enters the voids between the particles to loosen the same without any tendency to blow the material out of the hopper. In other words, the gas serves to "fluff" the powdered material.

In normal operation, the powdered material is supplied to the hopper 4 by the conveyor 6. The valve 92 is closed. That is to say, the imperforate portion thereof indicated by the dot-and-dash circle 114 in FIG. 3, is in a position blocking the outlet 28.

Figure 5:
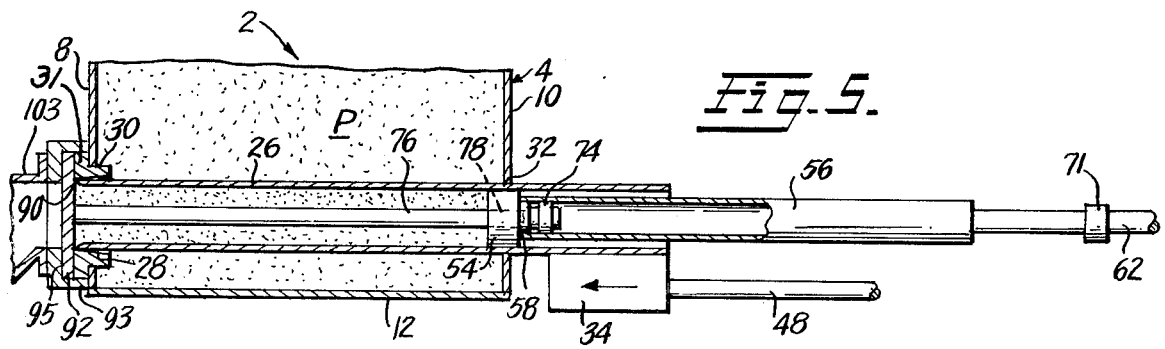
Figure 6:
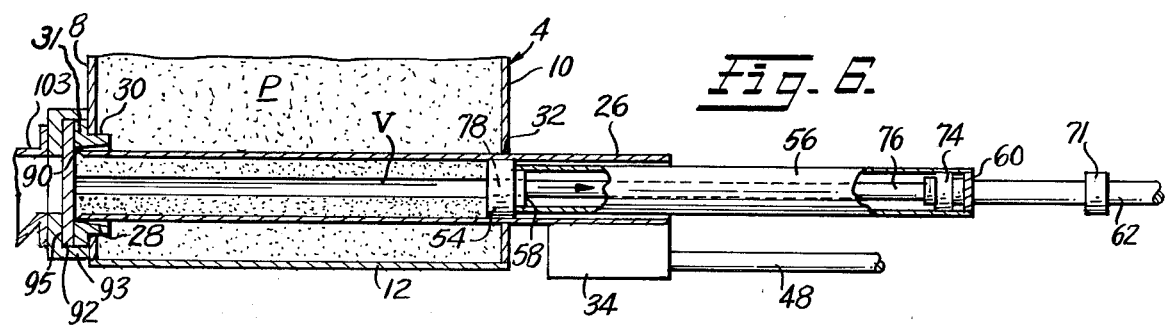
Figure 7:
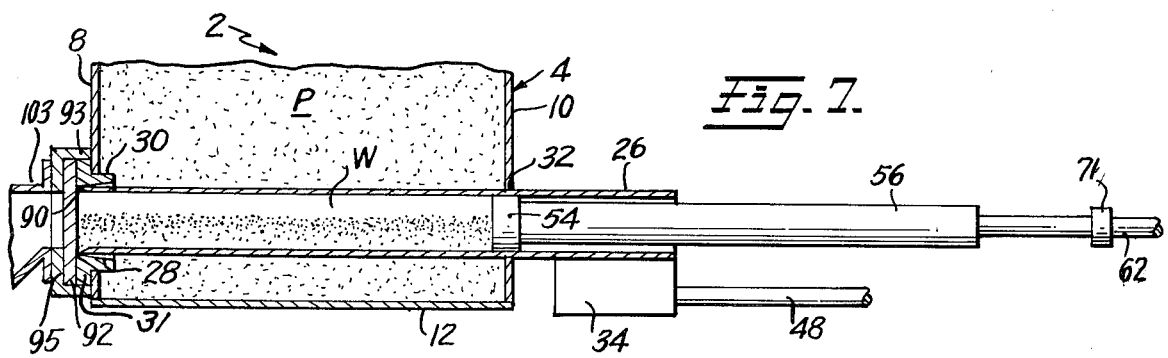

FIGS. 4 to 11 diagrammatically illustrate the pumping cycle of the present apparatus. In these views the powdered material is identified by the letter P. Referring to FIG. 4, the valve 92 is shown in its closed position. The main piston 54 and the sleeve 26 are both retracted, but the plunger 76 is shown fully extended into contact with the valve 92, as the first step in the method of pumping. FIG. 5 shows the next step, wherein the sleeve 26 is extended into the outlet 28 until its leading end is in contact with the valve 92. Such movement of the sleeve 26 entraps a portion of the material P surrounding the plunger 76. The plunger 76 is retracted, thereby leaving a void V, as shown in FIG. 6. Such void is formed when the moisture content of the powdered material is sufficient to make the particles cling together. In such case, a readily frangible cylinder of powdered material P is formed. On the other hand, if the powdered particles are dry, no central void will be formed. Instead, the material will collapse as the plunger 76 is being retracted and leave a void W above the entrapped material, as shown in FIG. 7. In either event, the voids V or W provide space in the sleeve 26, which allows the material to be pushed out of the sleeve without "caking" or forming plugs.

Figure 8:
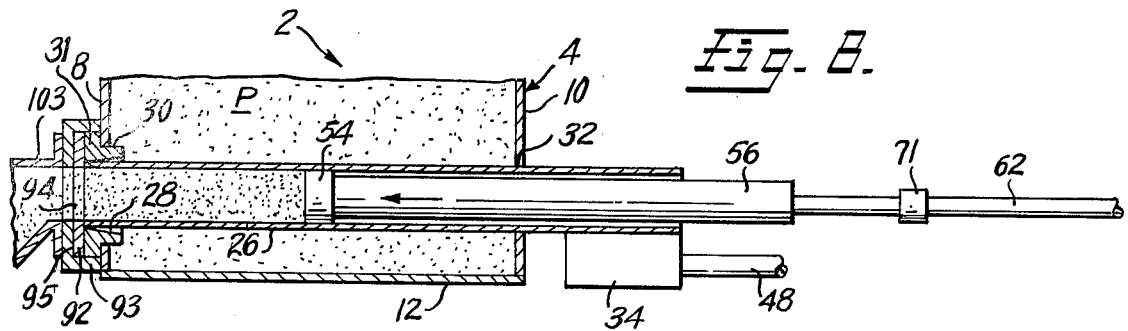
Figure 9:
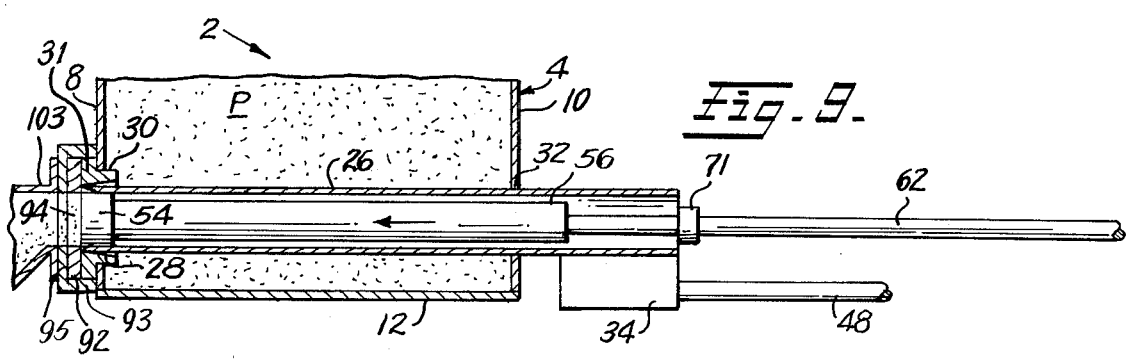

This leads to the next step in the method illustrated in FIG. 8, which shows the valve 92 open, and the main piston 54 being extended, thereby displacing the powdered material P from the sleeve 26 through the outlet 28 and the valve port 94, into the discharge chute 103. The main piston 54 is shown in its fully extended position in FIG. 9, wherein its exposed face lies in a vertical plane coinciding with the plane of the inner face of the slide valve 92. It will be noted that the entire content of material entrapped in the sleeve 26 has been displaced by the action of the main piston 54.

Figure 10:
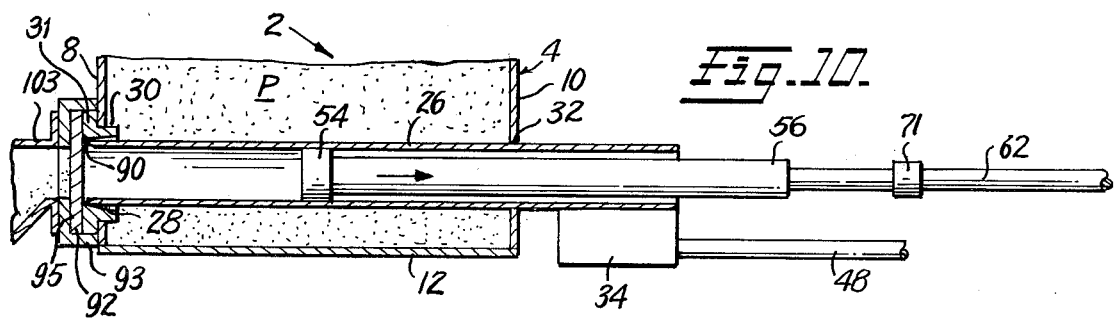
Figure 11:
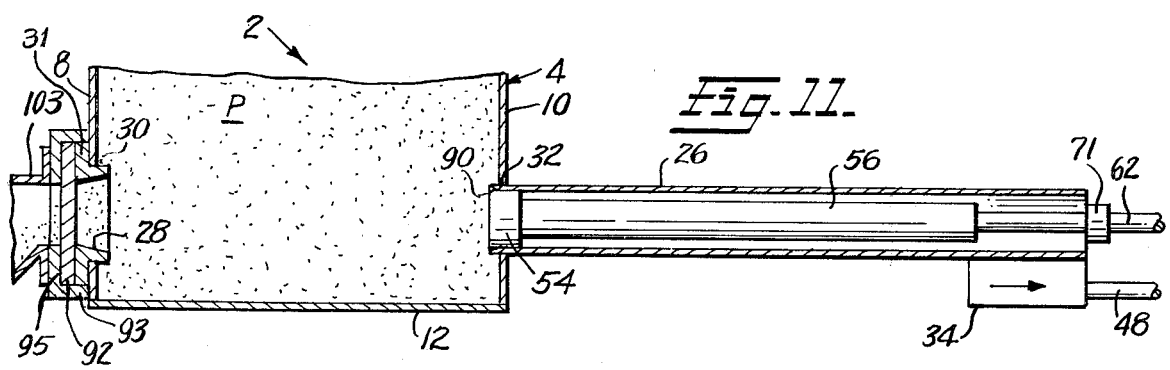

The next step in the method is illustrated in FIG. 10, wherein the valve 92 has been closed and the main piston 54 is being retracted. After retraction of the piston 54, the sleeve 26 is fully retracted to the position shown in FIG. 11. This completes the pumping cycle. It will be understood, of course, that after closing of the valve 92, the main piston 54 and the sleeve 26 may be simultaneously retracted to shorten the period of the pumping cycle. If the sleeve 26 is retracted at a faster rate than the main piston 54, movement of the sleeve 26 will be arrested by the engagement of its outer end with the stop 71 on the piston rod 62; whereupon, the sleeve 26 and main piston 54 may continue retraction at the same rate. The pumping cycle is repeated for continuous operation.

The above-described method, or cycle, has the advantage that the plunger 76 is extended in advance of the extension of the sleeve 26, thereby assuring the formation of a void in the sleeve when the plunger 76 is retracted. In this connection, the plunger 76 need not be fully extended before extension of the sleeve 26 is commenced. In other words, the plunger 76 and the sleeve 26 can be simultaneously advanced, so long as the plunger 76 maintains a "head start". However, it is preferred that the main piston 54 be controlled so that it does not start its extension movement until the plunger 76 has been fully retracted. In this connection, it will be understood that in practice, the various hydraulically controlled components described herein will preferably be automatically controlled instead of manually.

It will also be understood that the diameter of the plunger 76 is designed in proportion to the diameter and stroke of the main piston 54 and the characteristics of the material to be pumped, so as to insure against a bridge or plug forming as the main piston 54 moves forward and discharges the material from the sleeve 26. The void V, left when the plunger 76 retracts, serves a dual purpose: it not only counteracts bridging, but it also, when the material is being pumped against pressure, serves as a conduit through the material to be pumped, thus tending to equalize the pressure within the sleeve 26 and preventing the compressed gases from acting as a piston when the valve 92 is opened.

It will be further understood that the use of the invention is not limited to powdered coal and/or to use with a pressurized chamber, but that it can be used for pumping powdered cement, lime, etc. or any other material which presents a problem of bridging and packing. Likewise, the apparatus can also be effectively used with granular materials that do not have a tendency to bridge or pack.

It will be still further understood that various changes may be made in the design of the components of the present pumping apparatus, and that the steps in the method of pumping disclosed herein may be modified without departing from the principles of the invention or the scope of the annexed claims.

I claim:

1. The method of pumping powdered material from a hopper, comprising: extending a member into a body of powdered material in said hopper; entrapping a portion of said powdered material that is in surrounding relation to said member; withdrawing said member from said entrapped material to form a void therein; and discharging said entrapped material.

2. The method described in claim 1, including the step of: discharging the entrapped material into a pressurized chamber.

3. The method described in claim 1, including the step of: fluidizing the powdered material in the hopper.

4. The method described in claim 3, including the step of: using an inert gas to fluidize the powdered material in the hopper.

5. The method described in claim 1, including the step of: agitating the powdered material in the hopper to prevent it from bridging and packing in the hopper.

6. The method described in claim 1, including the steps of: fluidizing the material in the hopper while agitating the material in the hopper.

7. Pumping apparatus, comprising: a hopper for receiving material to be pumped, said hopper having opposed walls, one of said walls having a discharge outlet extending therethrough; a valve arranged to control the discharge of material through said outlet; means connected with said valve for opening and closing said valve; means extendible into and retractible from said hopper for forming a void in said material; the other of said walls having an opening axially aligned with said outlet; means extendible into said hopper through said opening for entrapping material surrounding said void-forming means; and means operable to discharge entrapped material through said outlet while said valve is open.

8. Pumping apparatus as described in claim 7, wherein the means for entrapping material is a cylindrical sleeve.

9. Pumping apparatus as described in claim 7, wherein the void-forming means is a plunger.

10. Pumping apparatus as described in claim 7, wherein the means for discharging the entrapped material is a piston slidably mounted in the material-entrapping means.

11. Pumping apparatus as described in claim 7, wherein the means for entrapping material is a cylindrical sleeve; the means for discharging entrapped material is a piston slidably mounted in said cylindrical sleeve; and the void-forming means is a plunger slidably mounted in said piston.

12. Pumping apparatus as described in claim 11, including means for fluidizing material in the hopper.

13. Pumping apparatus as described in claim 12, wherein the fluidizing means is located in the hopper below the path of travel of the cylindrical sleeve.

14. Pumping apparatus as described in claim 13, including an agitator located in the hopper above the path of travel of the cylindrical sleeve.

15. Pumping apparatus, comprising: a hopper for receiving material to be pumped, said hopper having opposed walls, one of said walls having a discharge opening extending therethrough; a valve arranged to control the discharge of material through said outlet; means connected with said valve for opening and closing the same, the other of said walls having an opening axially aligned with said outlet; a cylindrical sleeve having an open end extendible through said opening into said hopper for entrapping a portion of the material in said hopper; means connected with said sleeve, operable to extend the same until its open end enters said discharge outlet; means extendible and retractible relative to said sleeve for forming a void in the entrapped material upon retraction thereof; and means in said sleeve for discharging the entrapped material therefrom when said valve is open and said void-forming means has been retracted.

16. Pumping apparatus as described in claim 15, including fluidizing means in the hopper below the path of travel of the sleeve for fluidizing the powdered material in the hopper.

17. Pumping apparatus as described in claim 15, including a tapered discharge chute aligned with the discharge opening in said one hopper wall.

18. Apparatus for pumping powdered material, comprising: a hopper for receiving material to be pumped, said hopper having opposed walls, one of said walls having a discharge opening extending therethrough; a valve arranged to control the discharge of material through said outlet; means connected with said valve for opening and closing the same, the other of said walls having an opening axially aligned with said outlet; a cylindrical sleeve having an open end extendible through said opening; reciprocating means connected with said sleeve for extending said sleeve until its open end enters said outlet, and for retracting said sleeve; a main piston in said sleeve; a cylinder fixedly connected to said main piston; reciprocating means connected to said cylinder operable to move said cylinder and said main piston relative to said sleeve; an auxiliary piston in said cylinder, said main piston having a bore; a plunger connected to said auxiliary piston and extending through said bore in said main piston; and means controlling the supply and exhaust of operating fluid to said cylinder for effecting movement of said plunger relative to said main piston and said sleeve.

* * * * *